United States Patent [19]

York

[11] 4,445,191
[45] Apr. 24, 1984

[54] DATA WORD HANDLING ENHANCEMENT IN A PAGE ORIENTED NAMED-DATA HIERARCHICAL MEMORY SYSTEM

[75] Inventor: Kenneth L. York, Huntingdon Valley, Pa.

[73] Assignee: Burroughs Corporation, Detroit, Mich.

[21] Appl. No.: 288,079

[22] Filed: Jul. 29, 1981

Related U.S. Application Data

[63] Continuation of Ser. No. 65,990, Aug. 13, 1979.

[51] Int. Cl.³ ............................ G06F 9/00; G06F 7/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,967,247 | 6/1976 | Anderson et al. | 364/200 |
| 4,051,460 | 9/1977 | Yamada | 364/900 |
| 4,051,461 | 9/1977 | Hashimoto et al. | 364/200 |
| 4,070,706 | 1/1978 | Scheuneman | 364/200 |
| 4,092,713 | 5/1978 | Scheuneman | 364/200 |
| 4,166,211 | 8/1979 | York et al. | 364/200 |

*Primary Examiner*—Felix D. Gruber
*Assistant Examiner*—John G. Mills
*Attorney, Agent, or Firm*—Mervyn L. Young; Leonard C. Brenner; Kevin R. Peterson

[57] ABSTRACT

In a named-data hierarchical memory system wherein data is stored in pages at each memory level, a word valid bit to indicate the presence of data and a word modified bit is appended to each data word and associated detection and control apparatus is provided to permit the page oriented data to be stored and fetched on a word basis at each memory level. The detection and control logic functions to store only the data words in a page which contain actual data and to operate each level as a storage queue for the next lower level thereby eliminating the requirement and associated time delay of prefetching a page from the lower level before storage of any data words therein at the higher level.

1 Claim, 5 Drawing Figures

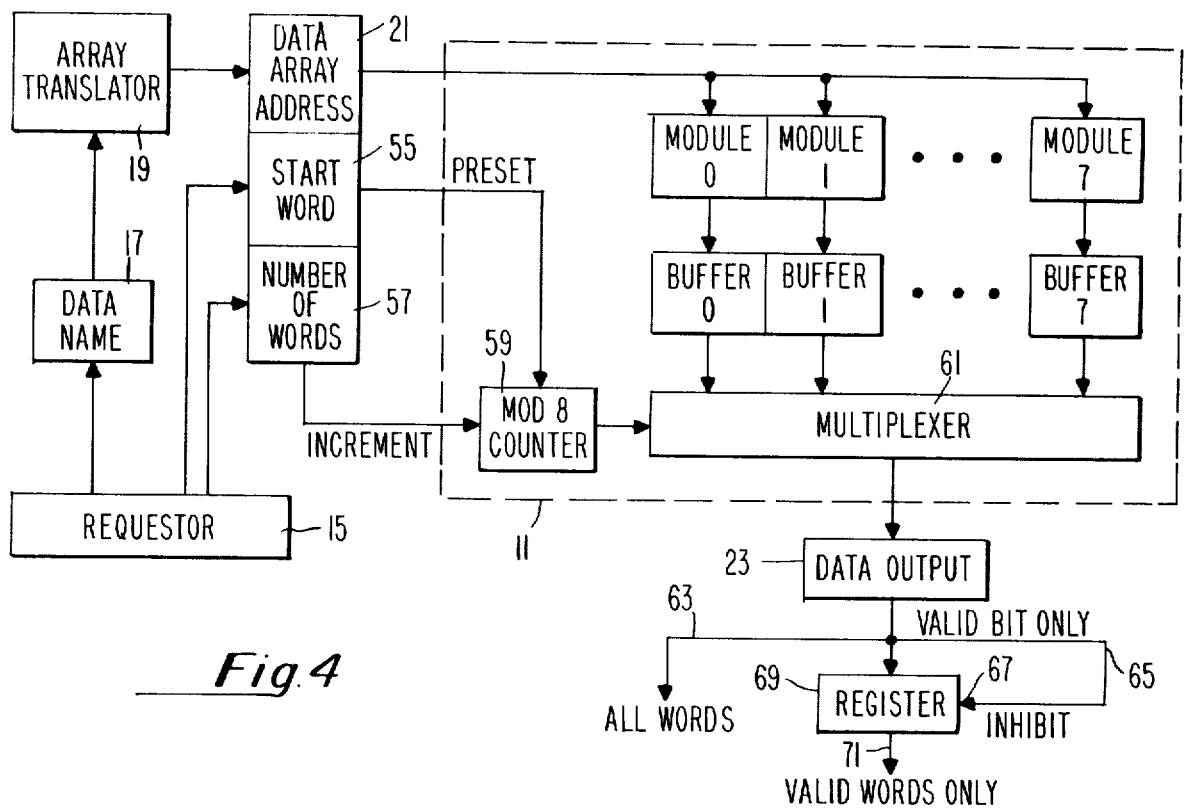
_Fig. 4_
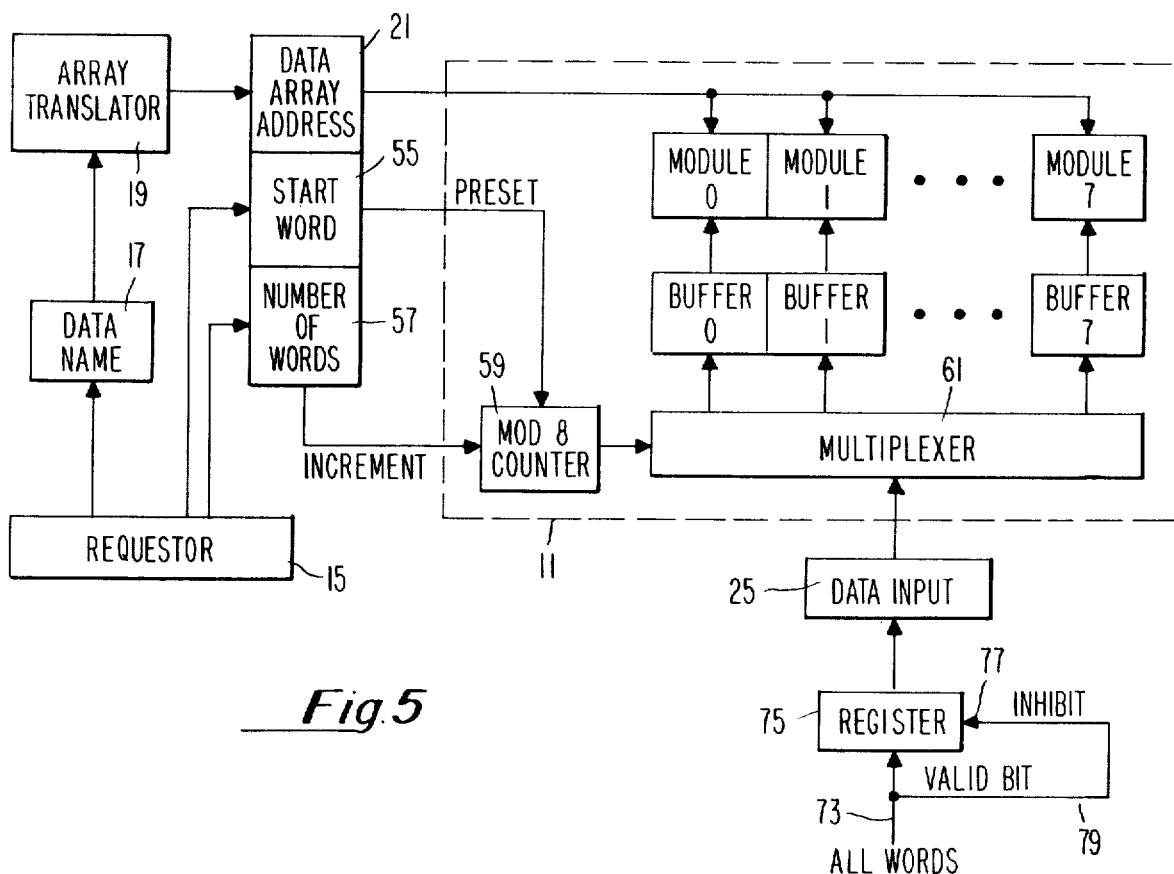
_Fig. 5_

DATA WORD HANDLING ENHANCEMENT IN A PAGE ORIENTED NAMED-DATA HIERARCHICAL MEMORY SYSTEM

CROSS REFERENCE TO RELATED APPLICATION

This is a continuation of application Ser. No. 065,990, filed Aug. 13, 1979.

In co-pending U.S. patent application, Ser. No. 893,068 filed Apr. 3, 1978, in the name of K. L. York et al and assigned to the assignee of the present invention there is disclosed and claimed therein a named-data hierarchical memory system. Although not limited thereto the present invention has utility in such a named-data hierarchical memory system.

BACKGROUND OF THE INVENTION

The present invention relates to data processing systems, particularly those systems employing a named-data hierarchical memory system wherein data is generally named, stored and transferred between levels by blocks or pages of data words.

In such a hierarchical system a relatively small fast high cost per-bit memory system at one level is serviced by a relatively large slow low cost-per-bit memory system at a lower level. Data in use or likely to be used is transferred to the faster memory level one block or page at a time wherein a page contains, for example, eight contiguous data words.

In a named-data hierarchical memory system, a requestor submits the data page name to a translator to locate the data page in one level. If the translator does not locate the name the data is accessed from the next lower level and transferred to the higher level. The requested data name is inserted by the translator into an empty slot, if any, or by overwriting a currently stored data name according to any one of many replacement rules.

Frequently it is desirable to fetch or store only several of the data words to be received within a page. If the words are contiguous, the words may be fetched or stored by giving the page address which corresponds to the address of the first word to be accessed in the page and the number of subsequent contiguous words to be accessed. Thus a simple instruction could read in effect "fetch the first 4 words of the page named A". However, non-contiguous words are not readily fetched or stored. To fetch every other word of a page (for example) a sequence of instructions would have to be executed serially. The instructions would read in effect "fetch word 2 of page named A; fetch word 4 of page named A; etc." Thus a series of time consuming steps and the expenditure of considerable hardware and software resources is required to fetch a plurality of non-contiguous words in a page.

Further, prefetching of an entire data name and a data page from a lower level into a higher level is required before loading any words of a page into the higher level if the entire page is not already stored at that level.

Therefore, it is an object of the present invention to simplify and enhance the page transfer and replacement process in a named-data hierarchical memory system;

It is another object of the present invention to eliminate the need for page prefetching when a new but partial page is to be stored;

It is another object of the present invention to simplify and enhance the handling of non-contiguous words in a page oriented named-data hierarchical memory system.

SUMMARY OF THE INVENTION

The above and other objects of the present invention are realized through the appending of a data word valid or present bit and a word modified bit to each word in a page and through the incorporation of detection and control logic for facilitating loading and fetching on the basis of the present and modified bits. The detection and control logic functions to store only the data words marked present in a page from a higher to a lower memory and to operate each memory level as a storage queue for the next lower memory level thereby eliminating the requirement of prefetching a page from the lower memory level before loading data words therein at the higher memory level.

The system configuration and operational details given above have been presented in simplified form. Other features of the invention will become more apparent in the detailed description presented hereinafter.

BRIEF DESCRIPTION OF THE DRAWINGS

FIG. 4 is a diagram depicting the logic for reading data on a word basis from the page oriented data array of FIG. 1; and FIG. 5 is a diagram depicting the logic for writing data on a word basis to the page oriented data array of FIG. 1.

DESCRIPTION OF THE PREFERRED EMBODIMENT

Figure 1:
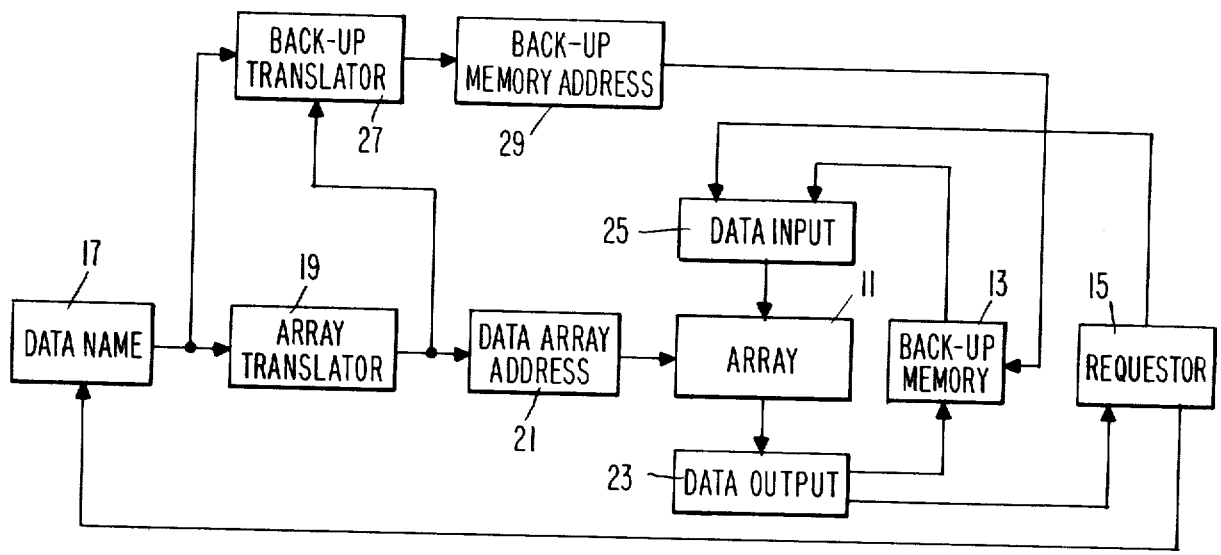
FIG. 1 is a block diagram of a named-data hierarchical memory environment for the functioning of the present invention.

The preferred embodiment for the present invention includes a data array storage unit 11 and a back-up memory 13, see FIG. 1. The data array 11 is a high speed cache for storing data words, usually grouped as pages while the back-up memory 13 provides larger generally slow storage for data words not currently being accessed. In a named-data memory access operation, a requestor 15 provides a data name to a data name register 17 and from thence to a translator such as the array translator 19 which seeks to find or generate the address of the location in the data array 11 which is storing the data word associated with the data name supplied by the requestor 15.

If the data word sought by the requestor 15 is located in the data array 11, the address thereof is provided to a data array address register 21 which addresses the register to read the addressed data word out through a data output register 23 to the requestor 15 if a read operation is requested or to write the data word into the data array 11 through a data input register 25 from the requestor 15 if a write operation is requested. If a data array address cannot be provided by the array translator 19 then the back-up translator 27 is utilized to provide the back-up memory address register 29 with an address for the back-up memory 13 which in turn provides requested data word to the data array 11 through input data register 25. Also during this process the requested data name is inputted to the array translator 19. If space is available in the array translator 19, the requested data name is inserted thereat. If no space is available then a replacement process is initiated whereby a currently stored data name is replaced by the newly requested data name. The exact replacement rule or procedure is not material to the present invention.

The above brief description of the preferred embodiment for the present invention is more fully detailed in the co-pending U.S. patent application, Ser. No. 893,068, filed Apr. 3, 1978, in the name of K. L. York et al and assigned to the assignee of the present invention.

Figure 2:
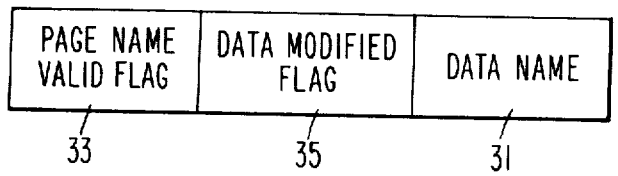
FIG. 2 is an illustration of the formatting of data names stored in a translator of FIG. 1.

In the array translator 19 there is provided storage for each data page name 31 and associated therewith a page name valid flag 33 and a data modified flag 35, see FIG. 2. The page name valid flag 33 is a logical bit which indicates page name is present and thereby suggests among other things, that a page name is a likely candidate for replacement under the procedures discussed above. The page data modified flag 35 is a logical bit which indicates that the requestor 15 (FIG. 1) has written data into one or more of the data words in a page and therefore has modified that data with repect to the page stored in back-up memory 13 (FIG. 1). A data transfer is initiated to transfer the data between the back-up memory 13 and the data array 11 to insure that each data name will fetch correspondingly the same data from both the data array 11 and the back-up memory 13.

Figure 3:
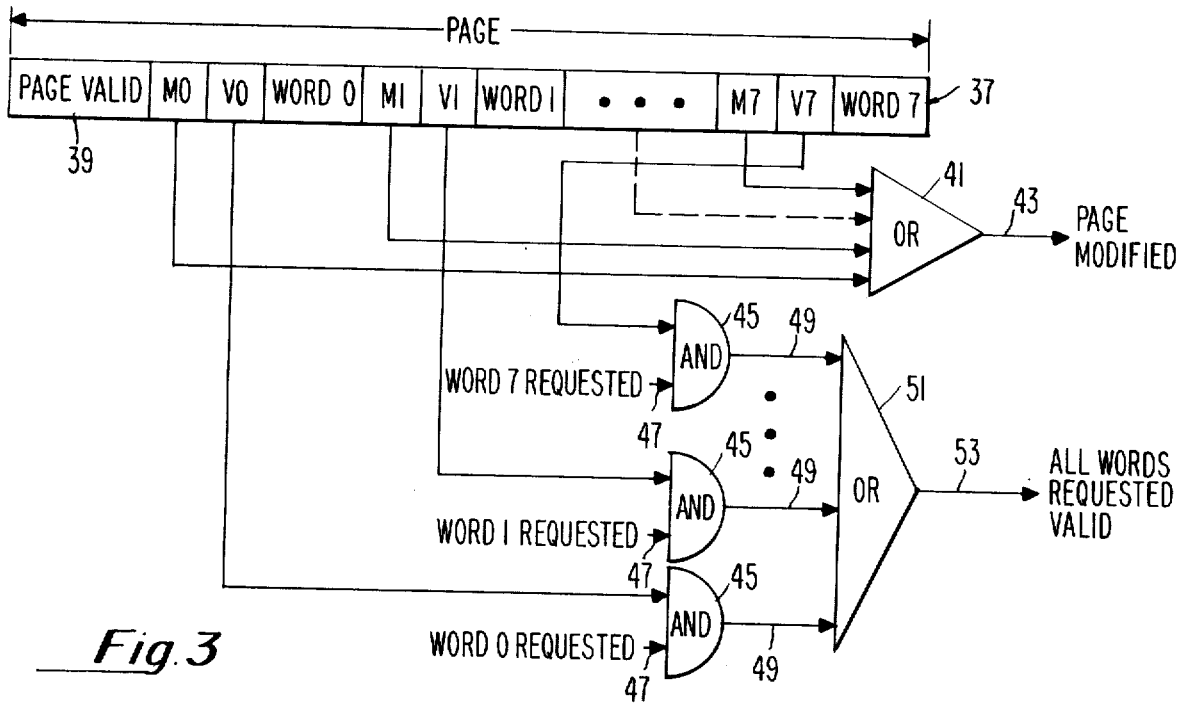
FIG. 3 is an illustration of the formatting of data words stored in a page oriented data array of FIG. 1 and of logic circuits associated therewith.

Data words are stored in blocks or pages in the data array 11, see FIG. 3. Each page data 37 includes a page valid presence flag 39 which indicates that one or more of the word locations in the page valid data. Error checking and correcting bits or codes as detailed in the above-cited U.S. patent application, Ser. No. 893,068, may also be associated with each data word. Each word has appended thereto a modified flag, the modified flags or bits being designated M0 through M7 in FIG. 3. Each word also has appended thereto a data presence flag or bit being designated V0 through V7.

Each of the word modified bits M0 through M7 are inputted to a logical OR gate 41 to generate an output 43 indicating whether the page 37 has been modified. With reference again to FIG. 2, it is appreciated that the data modified flag 35 need not be stored with the data name 31 because it can be generated by logically ORing all of the word modified flags M0 through M7.

With reference again to FIG. 3, it is clear that, if desired, all the word present bits V0 through V7 could be like-wise ORed together to generate a page data present bit, 39. However, as shown, each word present bit V0 through V7 is first combined in a logical AND gate 45 with an input line 47 indicating whether that particular word in the page 37 was requested. The output 49 of each AND gate 45 is fed to a logical OR gate 51 which generates on its output 53 a signal indicating whether each page word requested contained real information. Thus page 37 may contain word locations with no actual information but still be of complete functional utility for requests involving only the word locations which do contain real information.

The value of being able to detect when a requested word location has been modified or contains real information greatly enhances performance in an operational environment wherein partial pages are requested and wherein the request is formatted as requesting a particular page, starting at a particular word in the page and continuing for a given number of words, see FIG. 4. As detailed above, the requestor 15 supplies the request data name to the data page name requestor 17 which in turn submits it for translation into an actual physical location in data array 11 by translator 19. Translator 19 in turn provides the translated address to the data array address register 21 which addresses the data array 11. With reference to FIG. 4, the data array 11 is sectioned into eight addressable storage modules denoted as module 0 through module 7. The eight words in a page are stored individually at the same address in each module with word 0 being stored in module 0, word 1 being stored in module 1 and continuing thereas to word 7 in module 7. Thus, when a page is addressed to be read, word 0 is outputted from Module 0 to Buffer 0 and likewise to word 7 being outputted from Module 7 to Buffer 7. It is noted that each word carries with it its associated word modified and word present bits, see FIG. 3. The page present flag 39 may be stored along with word 0 in Module 0 or may be stored in a separate module, not shown. The error detection and correction information for a page word functions as described in the above-cited co-pending U.S. patent application, Ser. No. 893,068. The page present flag 39 may exist as a separate bit or may be generated if preferable for a particular application by logically ORing together each word present bit V0 through V7 associated with the individual words comprising the page.

The requestor 15 also provides the desired starting word in a page to be read to the start word register 55 and the number of contiguous words to be read to the number-of-words register 57. The start word register 55 presets a modulo 8 counter 59 while the number-of-words register 57 provides the counter 59 with information as to the number of times it is to be incremented. The counter 59 controls a multiplexer 61 which is inputted by all registers Buffer 0 through Buffer 7 and is outputted to the data output register 23. Data is thus transferred word-by-word to the data output register 23 as requested by the requestor 15.

The data output register 23 outputs on line 63 all words accessed through the multiplexer 61. A single bit line 65 receives only the presence flat from each word and is inputted to the inhibit control input 67 of register 69 to block all data words which do not contain real data and pass only present words on valid word only line 71.

Write operations are performed essentially the same as the above described read operations, see FIG. 5. Addressing is controlled by the requestor 15 through the array translator 19 as for a read operation. Likewise, the multiplexer 61 is controlled by the counter 59 to multiplex words via Buffer 0 through Buffer 7 to Memory Module 0 through Memory Module 7. Words are supplied via data line 73 to register 75 having an inhibit control input 77 connected via line 79 to the presence flag bits on data line 73. Thus only present words are passed to the data input register 25.

With reference to FIG. 1 through FIG. 5, the basic operational procedures of the present invention is as follows:

1. A page name is presented by the requestor 15 for translation to the array translator 19.

2. If the page name is present in translator 19 and a data word is to be written, the data word is immediately written and its associated data word present and data word modified flags are set.

3. If the page name is present in translator 19, the page name valid flag 33 has been set, the data word to be read is present and the data word contains real data, it is immediately read.

4. If the page name is present in translator 19, and the data word is to be read and the page data word location does not contain present data, then the entire data page is accessed from the back-up memory 29 and only those words not already present are written into the data array 11. The words so written have their data word present flags set and their modified flags indicating that the data is not-modified. Data words for the page already present in the data array remain unchanged. The original request to access a data word is now processed as in step 3 above.

5. If the data page name is not present in the array translator 19, and if an empty location in the translator 19 is available, the data page name is inserted therein. If the original request was a write request, then the data is written as in step 2 above, not requiring the data page to be first fetched from the back-up memory 13. (The data page could be retrieved at any later time from the back-up memory 13 as in step 4 above).

6. If a data page name must be overwritten because no space is available in the translator 19, then if none of the data words are of a page are modified, as detected from the modified flags, that page is immediately invalidated and the space made available for use in step 5 above.

7. If the data page to be overwritten is modified then it is written to the back-up memory 13. The modified and present flags are sent to the back-up memory 13 along with each data word. This use of the data word present flag allows partial data pages to be written to the back-up memory 13 since the back-up memory 13 will store only those page word locations which contain data.

The use of the individual data present and modified flags permits the data array 11 to be free from the chore of prefetching data pages when data words are to be written. Essentially, the data array 11 functions as a storage queue, thereby eliminating the need for extra hardware for store queue handling.

The present invention thus supports the ability to store partial pages of data by use of the present flag associated with each data word thereby readily handling the movement of partial or sparsely populated pages of data. Effectively, a "data word" is transmitted for each word position in a page and the data present flag is detected to denote "real" data words.

The above description has been of one embodiment only by way of example and it should be appreciated by those skilled in the art that a number of modifications can be made without departing from the scope of the invention.

For example, FIG. 4 and FIG. 5 show a system wherein data words are read from and written to memory on a word-by-word basis. Obviously, one skilled in the art could increase parallelism to read and write on a page-by-page basis or revert to a serial process whereby data is handed on a bit-by-bit basis. Thus it is understood that the above description has been presented and should be interpreted in the illustrative and not the limiting sense.

What is claimed is:

1. A named-data page-oriented storage system wherein each page in a plurality of pages is individually identified by a unique page name, said named-data page-oriented storage system and wherein the detection and control logic functions to store only the data words in a page which contain actual data and to operate each level as a storage queue for the next lower level thereby eliminating the requirement and associated time delay of prefetching a page from the lower level before storage of any data words therein at the higher level comprising:

data array means for addressably storing temporarily said plurality of data pages, each data page therein comprising a plurality of data words, each data word therein having a presence flag associated therewith indicating the actual presence of data in the associated data word location of the page;

addressing means coupled to said data array means for addressing in parallel all data words in a data page in said plurality thereof, said addressing means including means for receiving a data page name, means for translating said received data page name into the address wherein the data page identified by said received data page name is stored, and means for providing said translated address to said data array means;

accessing means coupled to said data array means for accessing serially on a word-by-word basis a plurality of contiguous data words in said data page addressed by said addressing means;

said accessing means including:

means for starting said accessing at a particular data word in said data page addressed by said addressing means; and means for continuing said accessing on a word-by-word basis for a particular number of contiguous words;

means for reading out of said data array means only those data word locations addressed by said addressing means which are indicated as containing data by their individually associated presence flags;

said means for reading including:

a register for receiving in parallel one data word at a time from said data array means, said register having an inhibit control monitoring said data presence flag associated with each said received data word for passing through said register only those words indicated as containing actual data by their said associated presence flags.

* * * * *

UNITED STATES PATENT AND TRADEMARK OFFICE
CERTIFICATE OF CORRECTION

PATENT NO. : 4,445,191

DATED : April 24, 1984

INVENTOR(S) : Kenneth L. York

It is certified that error appears in the above-identified patent and that said Letters Patent is hereby corrected as shown below:

Col. 3, line 17, after "indicates" insert --if a--.

Col. 3, line 23, delete "data" and insert --page--.

Col. 3, line 32, delete "valid".

Col. 3, line 33, after "page" insert --contain--.

Col. 4, line 42, change "flat" to --flag--.

Col. 4, line 45, change "valid" to --present--.

Signed and Sealed this

Twenty-ninth Day of January 1985

[SEAL]

Attest:

DONALD J. QUIGG

Attesting Officer     Acting Commissioner of Patents and Trademarks